July 19, 1949.  A. L. FREE  2,476,409
AUTOMATIC REGENERATION CONTROL
FOR PULSE-ECHO SYSTEMS Filed March 6, 1946  6 Sheets-Sheet 1

CONTROL UPON SIMULTANEOUS
OCCURRENCE OF QUENCH OSC.
AND RECEIVED PULSES

CONTROL PRIOR TO SIMULTANEOUS OCCURRENCE OF
QUENCH OSCILLATOR AND RECEIVED PULSES.

INVENTOR.
ALBERT L. FREE
BY
AGENT

Patented July 19, 1949

2,476,409

UNITED STATES PATENT OFFICE 2,476,409

AUTOMATIC REGENERATION CONTROL FOR PULSE-ECHO SYSTEMS

Albert L. Free, Philadelphia, Pa., assignor, by mesne assignments, to Philco Corporation, Philadelphia, Pa., a corporation of Pennsylvania Application March 6, 1946, Serial No. 652,320

9 Claims. (Cl. 343—13)

This invention relates to improved methods of and means for automatically controlling the regeneration of superregenerative receiver circuits. It is particularly applicable to superregenerative receivers employed in radio ranging systems, in which the superregenerative receiver is unquenched during time-spaced intervals, the spacing of which is varied in a predetermined manner so as to render the receiver responsive to received signals produced by reflections of transmitted pulses from target objects at different ranges from the transmitting and receiving equipment.

In such systems it is desirable to control the regeneration and thereby the sensitivity of the superregenerative receiver so as to secure the maximum possible discrimination between desired signals and undesired noise. This may be effected by developing in response to the output from the superregenerator a control signal which is used in conventional manner to control the sensitivity of the superregenerator. However, if, as indicated above, the superregenerator is unquenched only during time-spaced intervals, and if each unquenching coincides with the arrival of a received pulse signal, the sensitivity control signal developed will depend upon the magnitude of the received signal, so that there will be a tendency undesirably to reduce the sensitivity of the superregenerator.

In copending application of Kenneth H. Emerson, Serial No. 651,649, filed March 2, 1946, and relating to Automatic regeneration control, there are disclosed methods of and means for overcoming this difficulty and for controlling the sensitivity of a superregenerative receiver, employed in the manner above indicated in a radio ranging system, so as to secure the maximum discrimination between desired signals and undesired noise. In accordance with his invention, Emerson provided a conventional superregenerator, including means for controlling the sensitivity thereof in response to its output, and, in addition, provided means for unquenching the superregenerator not only during intervals corresponding to the times of arrival of desired received signals, but also during other intervals occurring between the arrival of such desired signals. In this manner the sensitivity controlling signal developed in response to the output of the superregenerator is made to depend not only upon the output in the presence of desired received signals, but also upon the output in the absence of such signals but in the presence of noise. This permits the superregenerator to be controlled to an optimum level of sensitivity for maximum discrimination between desired signals and noise.

It is the principal object of the present invention to provide improved means for controlling the sensitivity of a superregenerator in accordance with the method proposed by Emerson and characterized in that the quantity of equipment employed for the purpose is substantially reduced as compared with that employed in the apparatus originally proposed by Emerson.

The manner in which this objective is achieved in accordance with the present invention as well as other objects and features of the invention, will become apparent from consideration of the following description and drawings. The invention will be described as applied to two typical radar systems differing one from the other in certain aspects of their modes of operation. In the drawings:

Figure 1:
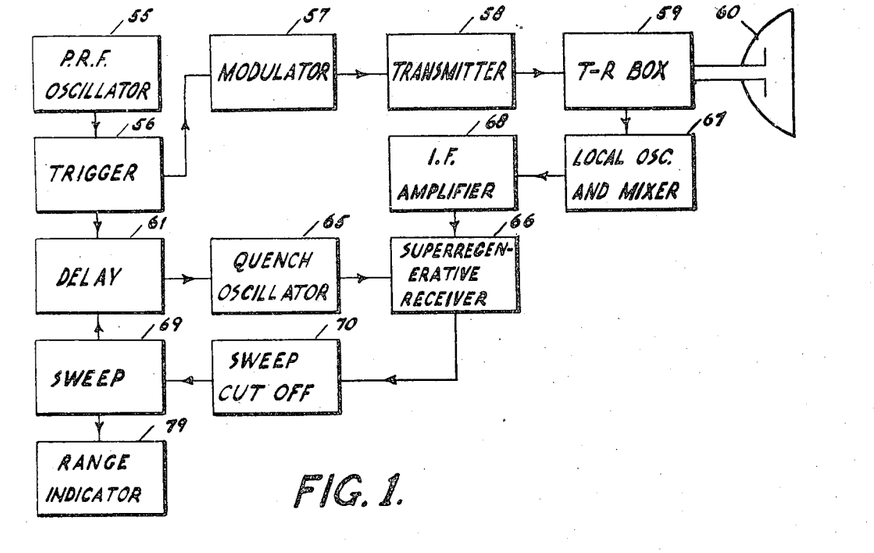
Figs. 1 and 2 are block diagrams illustrating generally two different systems to which the invention is applicable.

Referring to Figure 1, the pulse repetition frequency (P. R. F.) oscillator 55 may comprise any suitable oscillator, such as a multivibrator, generating time-spaced pulse signals corresponding to those represented at D in Figure 3 at a frequency of, for example, 2,000 cycles per second. These pulses are supplied to a trigger circuit 56 which may comprise a differentiating circuit for producing negative pulses corresponding to the leading edges of negative pulses from the P. R. F. oscillator and positive pulses corresponding to the trailing edges thereof, as represented at E in Figure 3, and a suitable amplifier for amplifying and inverting only the positive pulses obtained by differentiation to produce negative pulses of shorter duration at the P. R. F. rate, corresponding to those shown at A in Figure 3. These shorter duration pulses are supplied through an amplifier to the modulator 57 which in turn keys the transmitter 58 to generate pulses of radio frequency energy for transmission through T-R box 59 to antenna 60 and thence into space.

Figure 3:
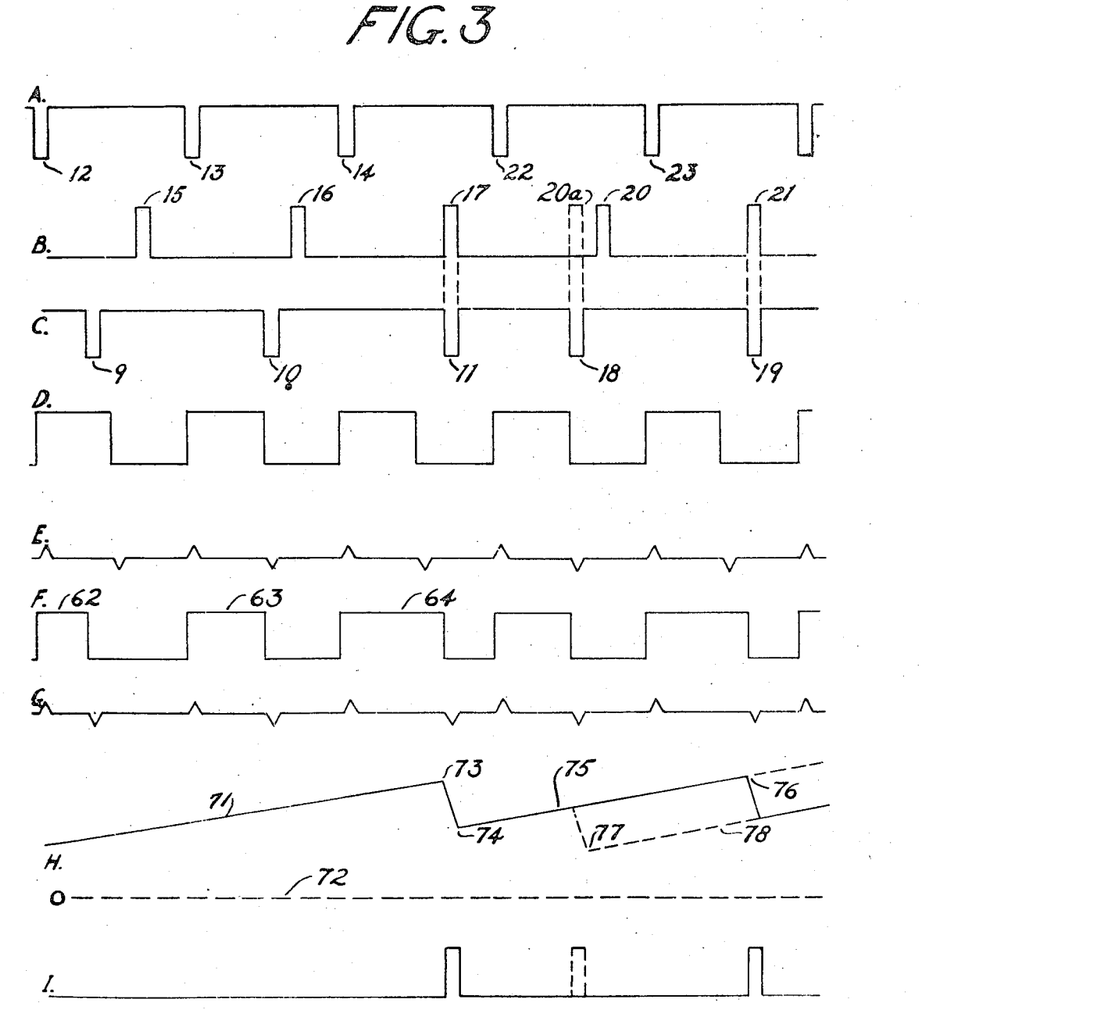
Fig. 3 illustrates waveforms existing at various points on the block diagrams of Figs. 1 and 2 and in the schematic diagrams of systems employing the invention, which comprise the subsequent figures.

Transmitter 58 may be any suitable generator of microwave energy, such as a magnetron oscillator, adapted to be keyed in response to pulse signals. T-R box 59 may be of conventional form, comprising a cavity resonator and associated spark gap, adapted to permit free transmission of pulsed radio frequency energy from transmitter 58 to antenna 60, while at the same time minimizing the amount of such energy reaching local oscillator and mixer 67, thereby to prevent interference with its operation and possible destruction of the crystal usually employed therein. The negative pulses from trigger circuit 56 are also utilized to initiate the generation of pulses of variable duration in the delay circuit 61, corresponding to those represented at 62, 63 and 64 in F of Figure 3. The delay circuit may also include a differentiating circuit for generating a signal comprising positive pulses corresponding to the leading edges of the variable duration pulses and negative pulses corresponding to the trailing edges thereof as represented at G in Figure 3. The negative pulses just referred to are utilized to synchronize quench oscillator 65 which may comprise a freely oscillating multivibrator synchronized by these negative pulses in a particular manner hereinafter to be explained. Pulses generated by the quench oscillator at the P. R. F. rate but delayed by varying amounts with reference thereto, as represented at C in Figure 3, are utilized to unquench the superregenerative receiver 66 at varying intervals of time after each generated pulse from the P. R. F. oscillator.

In certain embodiments of the invention, the quench oscillator may be omitted, and, as described hereinafter with particular reference to Figures 4 and 4A, the above-mentioned negative pulses from the differentiator may be used directly to effect unquenching of the superregenerator. Pulses of transmitted energy reflected by target objects within range of the system are intercepted by antenna 60 as in any conventional radar system. They are transmitted through T-R box 59 to a local oscillator and mixer 67 where their carrier frequency, but not their rate of occurrence, is altered and they are then amplified in intermediate frequency amplifier 68. The amplified intermediate frequency pulses are then transmitted to the input of superregenerative receiver 66 and, whenever one of them occurs simultaneously with a pulse from quench oscillator 65, it will be amplified and detected in the superregenerative receiver. The duration of the pulses generated by delay circuit 61 may be varied automatically, for example from 1 to 14 microseconds, at a low frequency rate of for example 10 cycles per second (the 14 microsecond duration corresponding to a maximum target range of approximately 2,300 yards and the 1 microsecond duration corresponding to the minimum workable range of the system of approximately 165 yards). The delay of the quench oscillator pulses will therefore vary from 1 to 14 microseconds behind successive pulses generated by the P. R. F. oscillator 55. To control this delay there is generated, in sweep circuit 69, a saw-tooth voltage recurring at a 10 cycle per second rate. This sawtooth voltage is adapted to control the delay circuit 61 so as to vary the delay of pulses produced by it, and hence of the quench oscillator pulses, from 1 to 14 microseconds behind the P. R. F. oscillator pulses. When one of the latter pulses corresponds in time to a received pulse, the output from the superregenerative receiver 66 may be utilized to actuate a sweep cut-off circuit 70.

This circuit momentarily interrupts the growth of the saw-tooth wave generated by the sweep circuit 69 during the cycle in which this occurs and furthermore may be adapted momentarily to reduce its amplitude by a predetermined amount. This amount may be made sufficient to reduce the delay of a few immediately succeeding pulses generated by delay circuit 61 to such an extent that they will occur before the arrival of target-reflected pulses at the receiver. Accordingly the growth of the saw-tooth wave will resume immediately following the simultaneous occurrence of a delayed and a received pulse and the delay of quench oscillator pulses will again increase until one again coincides with a received pulse, whereupon the action just described will repeat itself. The nature of the wave form generated by the sweep circuit 69, both before and after the simultaneous occurrence of a quench oscillator pulse and a received, reflected pulse, is shown at H in Figure 3. The gradual rise of the solid line 71, with reference to the broken line 72 representing zero potential, corresponds to the gradual rise of the sweep circuit voltage up to the point 73 at which the quench oscillator pulse 11 occurs simultaneously with the received, reflected pulse 17. In accordance with the operation of this embodiment, as will be explained in further detail hereinafter, the saw-tooth voltage may thereupon be reduced to the point 74, whereupon it will again rise along line 75 to the point 76, at which, assuming the range of the target to remain the same, a succeeding quench oscillator pulse 19 occurs simultaneously with a succeeding received pulse 21. In the case illustrated this will occur upon the arrival of the second received pulse following the original coincidence, although it will be apparent that, by reducing the sweep voltage by an even greater amount, the next coincidence could be made even later. This mode of operation continues so long as a target is in range. Should the target approach the equipment during the interval following the coincidence of quench pulse 11 and received pulse 17, and prior to the arrival of the next received pulse 20, this pulse would be advanced as represented at 20a and might then coincide with the next succeeding quench pulse 18. This would initiate reduction of the sweep voltage to point 77 and would be followed by the resumption of sweep voltage buildup along line 78. On the other hand, should the target recede from the equipment during the interval following coincidence, the sweep voltage would continue to build up beyond point 76 along the broken line extension of line 75 until its amplitude corresponded to the delay needed to effect coincidence. In practice sweep cut-off circuit 70 is adjusted so that, upon the simultaneous occurrence of a received pulse and a quench pulse, the voltage generated by the sweep circuit 69 will be reduced by a sufficient amount to take account of the fact that the target may approach the equipment by some predetermined amount, or at some predetermined rate, during the interval preceding the next received pulse. In other words the delay of the next succeeding quench oscillator pulse is backed off sufficiently to take account of this possibility.

Inasmuch as the maximum voltage of the wave form generated by sweep circuit 69, at any time when quench oscillator pulses and received pulses are occurring simultaneously, will be a measure of target range, a suitable range indicator 79 responsive to this maximum voltage may be connected directly to sweep circuit 69.

It is to be noted that the range voltage thus derived depends solely upon the delay, with respect to transmitted pulses, of unquenching pulses which coincide with received target pulses. Contrary to the situation existing in a number of prior art systems, it is not required to maintain the shape of received target signals through a plurality of stages of intermediate frequency amplification. In the present system, such amplification is reduced to a minimum by the specialized application of a superregenerative receiver, and thereby this major source of error is eliminated.

Figure 2:
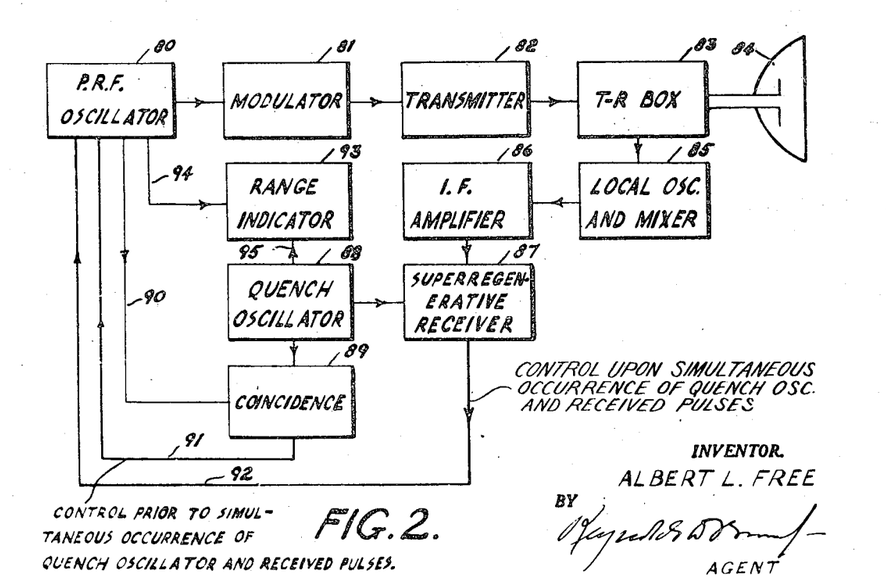

Referring now to Figure 2, P. R. F. oscillator 80, modulator 81, transmitter 82, T-R box 83, antenna 84, local oscillator 85, intermediate frequency amplifier 86, superregenerative receiver 87, and quench oscillator 88 may be substantially the same both in structure and in mode of operation as the corresponding elements of the embodiment shown in Figure 1, with the exception that in this embodiment quench oscillator 88 is a freely running oscillator held by suitable means to a frequency of, for example, 80 kilocycles per second. P. R. F. oscillator 80, prior to the simultaneous occurrence of a pulse from the quench oscillator and a received, target-reflected pulse, is controlled therefrom, through the medium of coincidence circuit 89, to a frequency differing slightly from a subharmonic of the quench oscillator frequency in either positive or negative sense. For example, if the subharmonic selected is the 40th, the frequency of the P. R. F. oscillator may be controlled to either 1990 or 2010 cycles per second so that a difference frequency of ±10 cycles per second exists between the frequency of the P. R. F. oscillator 80 and the 40th subharmonic of the quench oscillator frequency (2000 cycles per second). In either instance there will occur ten coincidences per second of quench oscillator and P. R. F. pulses. This control may be effected by feeding pulses from P. R. F. oscillator 80 through connection 90, and pulses from quench oscillator 88, to coincidence circuit 89 which is adapted to generate a control voltage in response to the simultaneous occurrence of pulses from the two sources. This voltage is supplied through connection 91 to P. R. F. oscillator 80 to maintain the desired relationship between its frequency and that of quench oscillator 88.

The net effect of controlling the frequency of the P. R. F. oscillator 80 in this manner is to cause quench oscillator 88, prior to the simultaneous occurrence of a pulse from the quench oscillator and a received, target-reflected signal, to generate pulses delayed by varying amounts with respect to the P. R. F. oscillator pulses, which pulses again may correspond to those shown at 9, 10 and 11 in C of Figure 3.

Upon the simultaneous occurrence of a quench oscillator pulse and a received pulse, the frequency of P. R. F. oscillator 80 must be readjusted momentarily, preferably so as to differ in the opposite sense from the 40th subharmonic of the quench oscillator frequency. In the instance in which the pulse repetition frequency originally exceeds the latter frequency this will mean momentarily reducing the pulse repetition frequency to less than 2000 cycles per second and will be the equivalent of momentarily reducing the delay of quench oscillator pulses with reference to P. R. F. pulses as was done in the instance of the embodiment of Figure 1 upon the simultaneous occurrence of a delayed P. R. F. and a received pulse. The alternative case in which the pulse repetition frequency is originally lower than the quench oscillator frequency and is momentarily increased above 2000 cycles per second, upon the simultaneous occurrence of the two pulses, corresponds to a mode of operation perfectly feasible but not described for the embodiment of Figure 1—namely, that in which the delay of quench oscillator pulses with reference to P. R. F. pulses is decreased rather than increased in the course of each sweep of the target range. The alterations to the embodiment of Figure 1 to achieve this alternative mode of operation will be obvious to those skilled in the art.

The objective as above set forth is achieved by utilizing the output of the superregenerative receiver 87, supplied to P. R. F. oscillator 80 through connection 92, further to control the frequency of the P. R. F. oscillator. Following the simultaneous occurrence of a given quench oscillator pulse and a given received pulse and the consequent momentary alteration in the pulse repetition frequency, the system will revert to its initial mode of operation in which P. R. F. oscillator 80 is controlled by coincidence circuit 89 so as to maintain a difference of 10 cycles per second between its frequency and the 40th subharmonic of the frequency of quench oscillator 88. This mode of operation will continue until a received reflected pulse again coincides with a quench oscillator pulse, at which time the output from the superregenerative receiver 87 will again control the frequency of P. R. F. oscillator 80 in the manner above described. It will be apparent that the amount by which the pulse repetition frequency is altered upon the simultaneous occurrence of a quench oscillator and a received pulse should be sufficient to take account of any change in target range which might occur prior to the occurrence of the next succeeding quench oscillator pulse. This adjustment is analogous to the one made to the embodiment of Figure 1 wherein, upon the simultaneous occurrence of a quench oscillator and a received pulse, the sweep voltage is momentarily reduced by an amount necessary to effect the required reduction in delay of immediately succeeding quench oscillator pulses.

Obviously the delay time, between P. R. F. oscillator pulses and 40th pulses of the quench oscillator which occur simultaneously with received reflected pulses, will be a measure of target range and accordingly in this embodiment of the invention a range indicator 93 is utilized which is adapted to give a range indication in response to P. R. F. oscillator pulses and quench oscillator pulses supplied to it through the connections 94 and 95.

Figure 4:
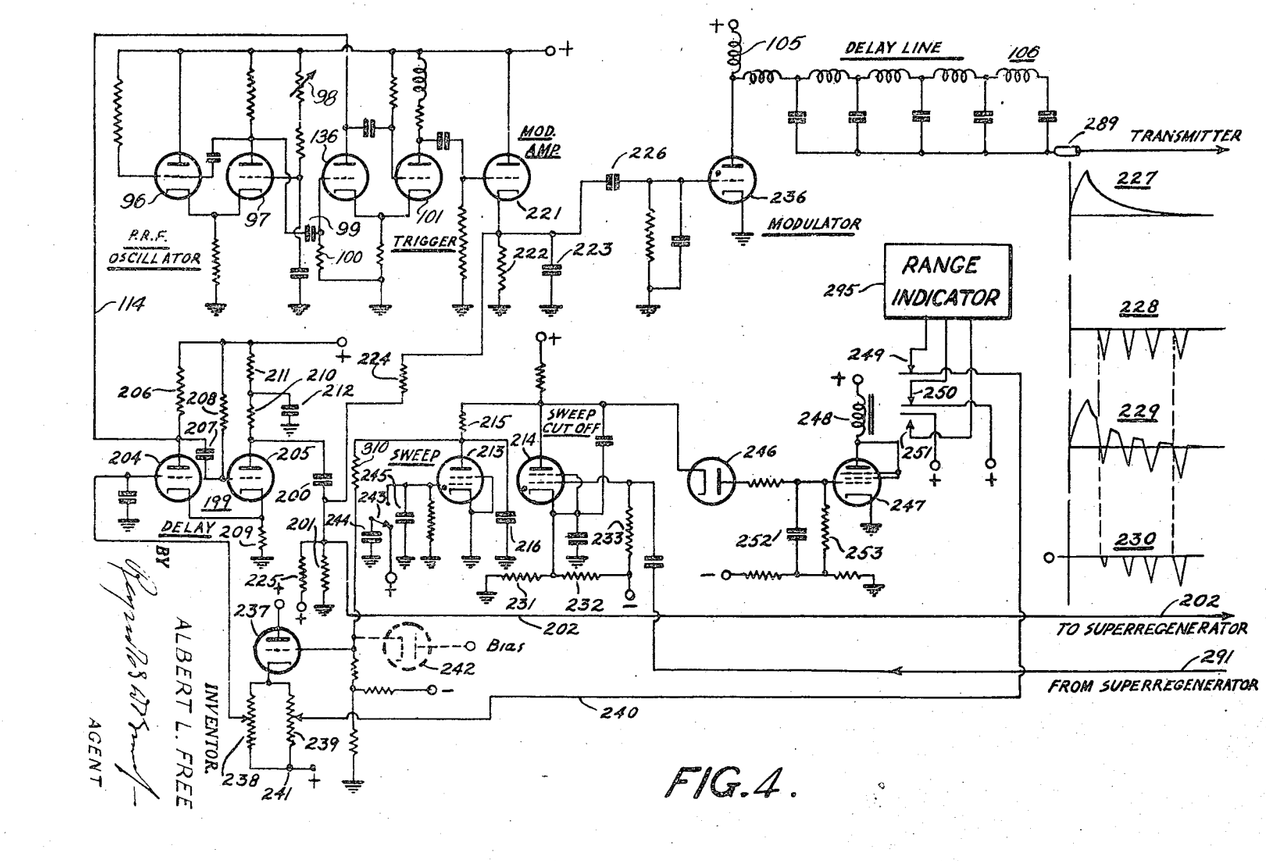
Figs. 4 and 4A, taken together, constitute a schematic diagram illustrating one form of system employing the invention.
Figure 4A:
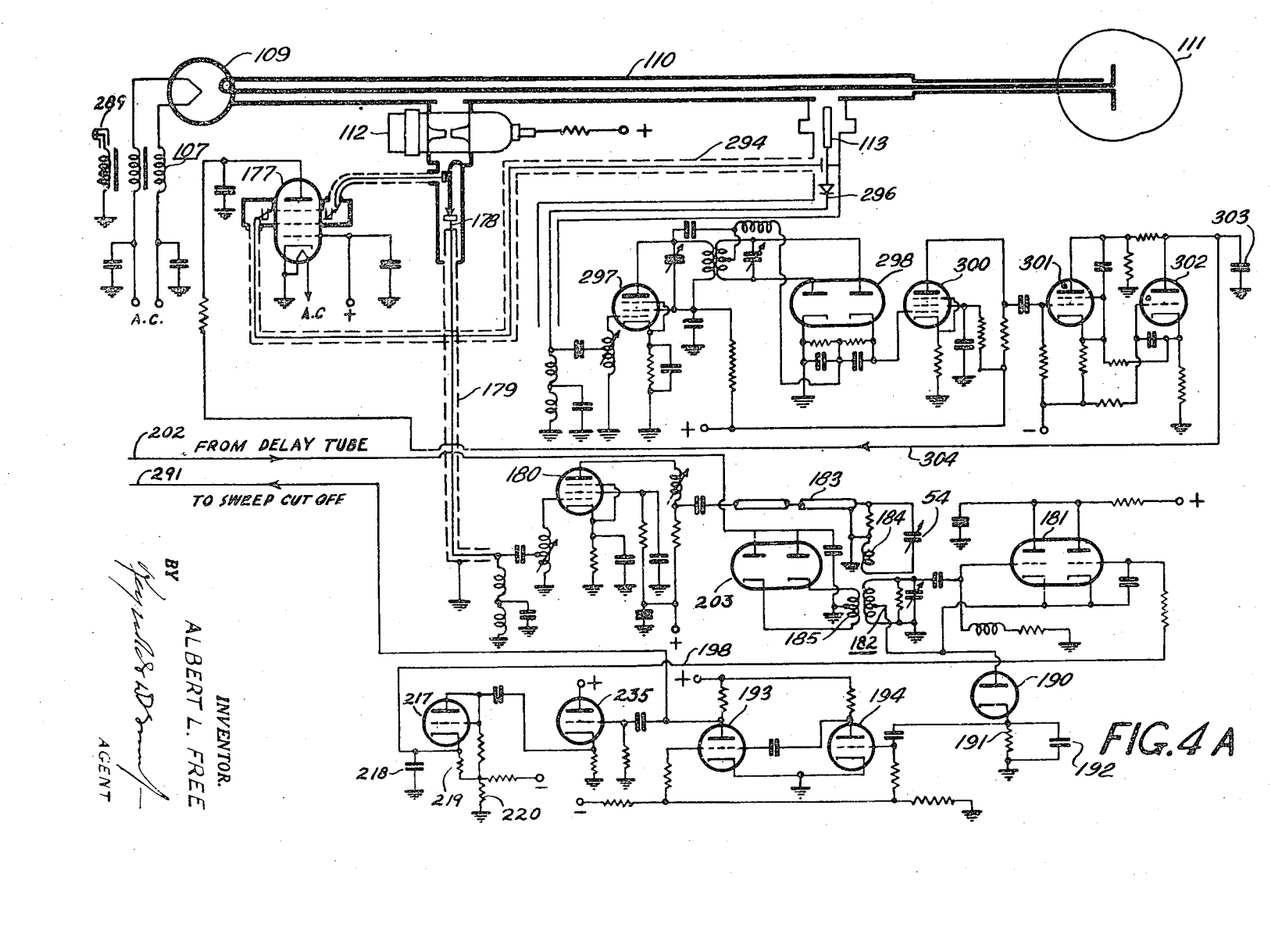

Referring now to Figures 4 and 4A, in the system there illustrated, the pulse repetition frequency oscillator 55 of Figure 1 may be a cathode feedback multivibrator oscillator comprising triodes 96 and 97 together with their associated connections. This oscillator may be adapted to oscillate at a frequency of approximately 2,000 cycles per second as adjusted by the variable resistor 98. Its circuits should be designed for maximum frequency stability and to give a suitable rectangular wave shape. Although its frequency may vary somewhat this will not affect the operation of the other circuits in accordance with the invention. The negative pulse derived from the plate of tube 97 is supplied through a differentiating circuit comprising condenser 99 and resistor 100 to the grid of a trigger tube 136, the output of which will be a pulse corresponding to the trailing edge of the negative pulse derived from the plate of tube 97. This pulse is fed from the plate of tube 136 to the grid of a trigger amplifier tube 101 and thence to the grid of a cathode follower tube 221, from the cathode load 222 of which a corresponding pulse is supplied to the grid of modulator tube 236, which may be a type 3C45 gas tube. The cathode follower tube 221 is used to provide a low impedance drive for the gas tube modulator to avoid variations in the time of its triggering. In the output circuit of the modulator tube 236 is connected a resonant charging choke 105 tuned by the capacitors of delay line 106 which may have a characteristic impedance of approximately 50 ohms and whose input is connected to the plate of the modulator tube in the manner shown. A modulating pulse which may be of the order of 2,200 volts is developed across resonant choke 105 and is supplied, through delay line 106 for shaping purposes, to the primary winding of pulse transformer 107. Included in this connection may be a transmission line 289 having a characteristic impedance of approximately 50 ohms, since in practice magnetron 109, to which the secondary of the pulse transformer 107 is connected, will be located in a separate pressurized unit from the circuits heretofore described. Magnetron 109 may be a type 2J39 tube operating in S band with a peak power output of approximately five kilowatts. Pulsed microwave energy from magnetron 109 may be supplied through a section of stub-supported coaxial transmission line 110 to a suitable radiating and receiving antenna 111. At suitable points along line 110 may be located T-R cavity 112 and capacity probe 113 for signal take-off, the exact functions of which will be explained in further detail hereinafter.

Negative pulse signals at the pulse repetition frequency of 2,000 cycles per second are also supplied from the plate of trigger tube 136 through connection 114 to the plate of tube 204, which together with tube 205 and associated connections comprises a cathode feed-back, non-oscillatory multivibrator. The function of this multivibrator is to generate positive pulses of varying duration whose leading edges correspond to the trailing edges of negative pulses generated by the P. R. F. oscillator. Its mode of operation is generally as follows: The grid of tube 205 is normally biased more positive than the grid of tube 204 so as to cause tube 205 normally to conduct. It should be noted, however, that the bias on tube 205 is determined not only by the potential applied to its grid but also by the drop in the cathode resistor 209 during the time the tube is conducting. Tube 204, on the other hand, is normally cut off. Upon the occurrence of a negative pulse supplied to it through connection 114 from the plate of tube 136, the grid of tube 205 will be driven sufficiently negative to cut off the tube. When this happens the cathode of tube 204 as well as the cathode of tube 205 will be reduced to ground potential and tube 204 will begin to conduct. The current drawn by tube 204 will of course depend upon the bias applied to its grid from potentiometer 238. As tube 204 begins to conduct its plate will go negative and apply a negative impulse to the grid of tube 205 to maintain it cut off. However this effect will gradually be overcome, as condenser 207 charges through tube 204, until a point is reached at which tube 205 again conducts. The circuit is then in condition to repeat its cycle in response to the next pulse supplied from the trigger tube. The duration of pulses generated by this delay multivibrator will be variable, depending upon the grid bias on tube 204, from 1 to 14 microseconds. From these varying width delay pulses a differentiated signal is derived across the resistor 201 of a differentiating circuit comprising this resistor and condenser 200, and the negative pulses, corresponding to the trailing edges of the variable width pulses from the delay multivibrator, are supplied through connection 202 to the plates of a pair of diodes 203 to effect unquenching of a superregenerative receiver consisting of the left-hand triode section of tube 181 and tank circuit 182, the operation of which will be discussed hereinafter.

The widths of pulses generated by the delay multivibrator 119 are determined by the voltage applied to the grid of tube 204 from voltage divider 238 connected in the cathode circuit of a cathode-follower tube 237. The latter tube has its grid connected directly through a resistor 310 to the plate of sweep tube 213, which may be a type 2D21 gas tube. Thus direct coupling is provided from the plate of sweep tube 213 to the grid of delay multivibrator tube 204. A condenser 216 is connected between the plate of tube 213 and ground to form a sawtooth oscillator which may be adjusted to oscillate normally at a frequency of, for example, 10 cycles per second. The sawtooth waveform developed on the plate of tube 213 is supplied through cathode follower tube 237 to the grid of tube 204 and thus causes the widths of pulses generated by delay multivibrator 199 to vary in accordance with variations in the instantaneous magnitude of the sawtooth waveform, for example from 1 to 14 microseconds 10 times per second. In the absence of any received, reflected signal, the sweep tube 213 will cause the delay multivibrator continually to sweep through the range of pulse widths from 1 to 14 microseconds, corresponding to ranges of from 165 to 2300 yards. However a sweep cut-off tube 214, which may also be a type 2D21 gas tube, is connected in shunt with condenser 216 and is supplied through connection 291 with pulses from the superregenerative receiver output, corresponding to received, target-reflected signals, to discharge the condenser 216 by a predetermined amount determined by resistor 215 whenever such a pulse is received. As has already been mentioned in connection with the description of the block diagram of Figure 1, the amount by which the condenser 216 is discharged by such a pulse is made such that the voltage to which the grid of tube 204 of the delay multivibrator is reduced corresponds to a delay somewhat less than the time actually required for the preceding reflected signal to be received from the target. As was explained this is to take account of any diminution of the distance from the equipment to the target. However, according to the present invention, a further consideration is involved in the selection of the amount of this discharge, which will be discussed hereinafter.

An output voltage proportional to the voltage developed across sweep circuit condenser 216 may be derived from an adjustable tap on potentiometer 239 connected in parallel with potentiometer 238 in the cathode circuit of tube 237. The peak value of this signal, when the system is locked on a target, will be a measure of the range of that target. By connecting the lower end 241 of the cathode load, comprising potentiometers 238 and 239, to a source of positive potential, the sweep voltage may be prevented from falling below some predetermined potential corresponding to minimum range. This will prevent jamming of the system by a strong continuous wave signal impressed on the receiver circuits, which would normally cause the sweep tube to fire continuously, the sweep voltage to fall below the potential corresponding to minimum range, and the width of the delay pulse to be reduced to such an extent as to permit the receiver to pick up its own transmitted signal. This feature can also be used to prevent the system from locking on targets closer than a predetermined minimum range, such, for example, as other friendly aircraft in a formation. Alternatively, the same result might be achieved by connecting the cathode of a diode 242 to the grid of tube 237 and connecting its plate to a suitable source of positive bias, as shown.

Sweep tube 213 may also be provided in this embodiment with a special form of in-switch to permit reducing the sweep voltage to zero in order to select a new target at a shorter range. This switching arrangement comprises a switch 243 normally connecting condenser 244 to a source of positive potential. When it is desired to reinitiate the sweep, switch 243 is thrown to its other position, connecting condenser 244 to the grid of sweep tube 213. The voltage developed across the condenser 244 will cause tube 213 to conduct heavily enough to reduce the sweep voltage to that corresponding to the minimum range of the system. The charge on condenser 244 will be quickly lost and the sweep voltage will start again in its normal manner. Condenser 245 is used to damp out the spark resulting when switch 243 is thrown. Condensers 244 and 245 in this arrangement may each have capacitances of 600 mm.-farads.

The range signal derived from the tap on potentiometer 239 is supplied through connection 240 and relay contact 249 to a suitable range indicator 295, which may be adapted to provide an indication of the peak amplitude of the voltage thus supplied. Means are provided for rendering range indicator 295 inoperative in the absence of a received target signal, so that no indication will be given by it under these circumstances. The signal for actuating such means can conveniently be derived from sweep cut-off tube 214 which draws current only in the presence of a received target signal. Because of the high load impedance in the plate circuit of this tube it can not be used as a source of power. Hence a peak detector comprising diode 246 and a high time constant load impedance, consisting of condenser 252 and resistor 253, may be connected to the plate of tube 214. The output of this peak detector is supplied to the grid of tube 247, in the plate circuit of which is connected coil 248 of a relay. Contacts 249 and 250 of this relay are normally closed, connecting the range output voltage to range indicator and supplying the range indicator with a suitable voltage to render it operative. Contact 251 is normally open but will be closed in the presence of a target signal to apply to the range indicator a suitable voltage for rendering it inoperative. At the same time contacts 249 and 250 will be opened so as to remove the range output signal and the normal operating voltage from the range indicator.

Although specific reference has not been made in the preceding description to the wave forms shown in Figure 3, in view of the fact that such reference was made in the description of the block diagram of Figure 1, it is felt that it will now be helpful to point these out. At D of Figure 3 is shown a rectangular wave of the sort which may be generated by the P. R. F. oscillator. It should be understood however that although positive and negative pulses have for convenience been shown to be of equal duration, this is not necessarily and in fact is not actually the case in the embodiment just described. At E is shown a signal, with negative and positive pulses corresponding respectively to the leading and trailing edges of the negative pulses in D, such as might appear on the grid of the trigger amplifier 136. At A are shown negative pulses, corresponding to the positive pulses of E, which might appear on the plate of trigger tube 136. At F are shown pulses of varying duration 62, 63 and 64 corresponding to those generated by the delay multivibrator and appearing at the plate of tube 205. At G are shown positive and negative pulses, corresponding respectively to the leading and trailing edges of the pulses at F, which would appear across resistor 201. At C are shown pulses 9, 10 and 11, variably delayed with respect to modulator pulses 12, 13 and 14, which are applied to diodes 203 to control unquenching of the superregenerator. At H is shown the wave form which might appear across condenser 216 of the sweep circuit before as well as after the reception of a target reflected pulse, and at I are shown pulses corresponding to the output of the superregenerative receiver which would be applied through connection 291 to the grid of sweep cut-off tube 214.

Referring still to the schematic diagram of Figures 4 and 4A there will now be explained in detail the operation of the superregenerative receiver, shown generally at 66 in the block diagram of Figure 1, and its associated circuits. Received target-reflected signals derived from T-R box 112 are mixed with a signal from local oscillator 177 in crystal mixer 178 and the resulting intermediate frequency is supplied therefrom through transmission line 179 to the input of buffer preamplifier tube 180. It is to be noted that the primary function of this tube is to prevent radiation through the antenna 111 of signal from the superregenerator and that, except for this requirement in certain military applications, the tube might be omitted inasmuch as sufficient amplification is provided by the superregenerator alone. In order accurately to maintain the frequency of the local oscillator 177, which may comprise a type 2K28 Klystron, an automatic frequency control circuit is employed. To this end, received signals derived from another point on transmission line 110 by means of capacity probe 113 are mixed in crystal mixer 296 with local oscillator signal supplied through connection 294. The resulting signal is amplified in a suitable intermediate frequency amplifier 297 and supplied to a conventional discriminator comprising double diode 298 and associated circuits. From the output of the discriminator are derived positive or negative pulses, the polarity of which will depend upon the relation between the transmitter and local oscillator frequencies as compared to the intermedaite frequency tuning of the discriminator. These pulses are amplified in the pulse amplifier tube 300 and are supplied from the output thereof to the grid of a gas discharge tube 301. The latter is connected in shunt with a second gas discharge tube 302 which, together with condenser 303, constitute a sawtooth oscillator which may be adjusted to operate at a low frequency of, for example, 5 cycles per second. The voltage developed across condenser 303 is supplied through connection 304 to the repeller of local oscillator tube 177 to vary its frequency through a range comprising those frequencies which, when mixed with frequencies within the range at which the transmitter might operate, will yield the desired intermediate frequency. Thus the gas tube oscillator will tend to sweep the frequency of the local oscillator 177 through this range 5 times per second. However the positive pulses from the pulse amplifier 300, appearing on the grid of tube 301, will cause it to conduct whenever the frequency of the transmitter exceeds the frequency to which the discriminator is tuned. This will discharge condenser 303 by a certain amount so as to tend to maintain the voltage thereacross, and hence the frequency of local oscillator 177, constant.

The left hand triode section of tube 181, together with tank circuit 182, comprise a superregenerative oscillator which may be adjusted to operate at a frequency in the neighborhood of 60 megacycles. Pulses of intermediate frequency energy corresponding to target signals will be supplied to tank circuit 182 through connection 183 and an inductor 184 coupled to the tank circuit inductance. Unquenching pulses at the P. R. F. rate of 2 kilocycles, and variably delayed with respect to transmitted pulses from the P. R. F. oscillator, will also be supplied through connection 202 to a damping circuit comprising double diode 203 and inductor 185 coupled to the inductor of tank circuit 182. These unquenching pulses will have been steepened and narrowed to a width of approximately one-half microsecond by means of the differentiating network 200, 201. In the presence of received signals oscillations in the tank circuit 182 will build up more rapidly, and to a higher level during the unquench interval, than in their absence. The rate of build-up of oscillations may be adjusted so that, in the absence of received signal, they will not build up during the unquench interval beyond a predetermined level; while, in the presence of received signal, they will build up appreciably beyond this level. This adjustment is conveniently made by adjustment of the coupling between inductor 184 and the inductor of tank circuit 182 and by adjustment of the tuning of the circuit comprising inductor 184 and condenser 54 to differ somewhat from the resonant frequency of tank circuit 182. It will be apparent also that the duration of the unquench interval is an important factor in controlling the difference between the output of the superregenerator in the presence and in the absence of received signal. As already mentioned the duration of this interval can readily be controlled by differentiating or otherwise narrowing the pulses generated by the delay multivibrator. To distinguish between the output of the superregenerator with and without received signals, there was utilized, in this embodiment of the invention, a diode rectifier tube 190 provided with a suitable load resistor 191, by-passed by condenser 192. Upon the arrival of a reflected pulse simultaneously with the unquenching of the superregenerator, substantial pulses will appear across resistor 191. These are amplified in a pulse amplifier comprising tubes 193 and 194 and the output is supplied through connection 291 to the grid of sweep cut-off tube 214 to cause this tube to conduct whenever a target signal is received as hereinbefore explained.

In the present embodiment, automatic regeneration control voltage is developed by a triode 217, which is supplied with amplified target pulses from the plate of tube 193 through a cathode follower tube 235. The control voltage thus developed across resistors 219 and 220, in the cathode circuit of tube 217, is supplied through connection 198 to the control grid of the right-hand section of tube 181. The latter has its plate and cathode connected respectively to the plate and cathode of superregenerator section of tube 181 and is thus effective, in response to the control voltage applied to its grid, to vary the sensitivity of the superregenerator. To insure most effective operation in accordance with the invention, the time constant of the automatic regeneration control circuit must be appropriately adjusted. This is accomplished by proper selection of the values of condenser 218, resistor 219 and resistor 220 associated with tube 217. Assuming that, in a manner presently to be explained, the superregenerator is to be made receptive only to every fifth reflection arriving from a given target object, these values may be selected as follows:

Condenser 218 _____________________ mmfd __ 1,000
Resistor 219 _____________________ megohm __ 1
Resistor 220 _____________________ ohms __ 2,700

These values will give a time constant equal to 1,000 microseconds or approximately two-fifths of the time interval between every 5th target-reflected pulse. This time constant will be such as to permit the automatic regeneration control voltage to fall from a level corresponding to the presence of a received signal to the no-signal level between every 5th target-reflected pulse, and since the intermediate target-reflected pulses will not be amplified by the superregenerator, they will not affect the operation of the automatic regeneration control. The superregenerative receiver may be designed so as to limit the peaks of received signals exceeding a given level, so that, at the discharge rate prescribed by the circuit constants of the automatic regeneration control circuit, the return to no-signal level of the automatic regeneration control voltage will be assured. Thus strong signals from nearby targets will be prevented from adversely affecting the sensitivity of the superregenerator. There will of course be no difficulty in connection with signals from more distant targets as they will be weaker and will not affect the automatic regeneration control circuits to as great an extent as the larger signals from closer targets.

In accordance with the principles set forth in the copending application of Kenneth H. Emerson, hereinbefore referred to, the superregenerative receiver is to be unquenched during certain intervals which do not coincide with the arrival of signals, as well as during intervals which do coincide. Under these circumstances, the automatic regeneration control voltage developed will depend upon the output of the superregenerator in the absence of received signals as well as in their presence. As taught by Emerson, this is conducive to optimum discrimination between desired signals and undesired noise. In accordance with the present invention this result is obtained by adjusting the low frequency sweep oscillator, consisting of gas tube 213 and condenser 216, so that upon the reception of a target signal the sweep voltage developed across condenser 216 will be reduced by an amount sufficient to prevent a substantial number of immediately succeeding target signals from being amplified by the superregenerator. For example, in this embodiment, cut off tube 214, which discharges condenser 216 by a predetermined amount in response to a received and amplified target signal applied to its grid, may be a type 2D21 gas tube, condenser 216 may have a capacitance of 0.5 microfarad, resistor 215 a value of 1.5 megohms, resistor 231 a value of 82,000 ohms, resistor 232 a value of 2,200 ohms, resistor 233 a value of 180,000 ohms, and the negative bias voltage applied to the control grid of tube 214 through resistor 233 may be 150 volts. These constants will be such as to permit amplification by the superregenerator of but one in every five target-reflected pulses.

In general, in a radio ranging system such as the one in accordance with the present invention, it will be desirable to vary the sensitivity of the receiver circuits in such a way as to provide relatively low sensitivity for nearby targets and appreciably greater sensitivity for more distant targets. This is desirable in order to eliminate the effects of interference which may exist for nearby targets owing to the time proximity of transmitted and received pulses, as well as to the existence of spurious signals generated by the transmitter. It is permissible because of the fact that signals from nearby targets are appreciably greater in amplitude than those from more distant targets and hence require less sensitivity for satisfactory reception. In the present embodiment of the invention, the sensitivity of the superregenerator can readily be varied by varying the amplitude and/or steepness of the unquenching pulses applied thereto. This steepness or amplitude should be varied so as to increase throughout each cycle of the sweep tube and may to some extent be achieved by designing delay multivibrator 199 in such a way that the steepness of the trailing edge of the delay pulse will increase in proportion to its width. Hence when the trailing edge of the delay pulse is differentiated, a pulse will be obtained whose amplitude and steepness is proportional to the width of the pulse. In the present embodiment, to yield this result tubes 204 and 205 of the delay multivibrator comprise the two sections of a double triode, type 6J6, and the constants of the delay multivibrator circuit are as follows:

| | |
|---|---:|
| Resistor 206 ohms | 20,000 |
| Condenser 207 mm.-farads | 150 |
| Resistor 208 megohm | 1 |
| Resistor 209 ohms | 2,200 |
| Resistor 210 do | 4,700 |
| Resistor 211 do | 3,900 |
| Condenser 212 microfarad | 0.01 |

However in general the amount of variation in sensitivity which can be obtained in the manner just described will be insufficient to yield the best results and it will be desirable to provide further means for controlling the sensitivity of the superregenerator. Another method of doing this, shown in the schematic of Figures 4 and 4A is to derive across an R. C. circuit, comprising resistor 222 and condenser 223 in the cathode circuit of modulator amplifier tube 221, a shaped pulse corresponding to each P. R. F. pulse and of the general form shown at 227. However it should be noted that the shape of the pulse shown at 227 has been modified by the omission of a large positive excursion at its peak. This corresponds to the pulse from the trigger tube which keys the modulator 236 and has been omitted for convenience in illustration since it does not affect the operation of the automatic sensitivity control circuits. The duration of this pulse is preferably made somewhat less than the time interval corresponding to the maximum range of target on which the system is to operate and should decrease in instantaneous amplitude from a time in each sweep cycle corresponding to minimum range to a time later in the sweep cycle corresponding to somewhat less than maximum range. It may be supplied through resistor 224 to connection 202 which normally supplies unquenching pulses from delay multivibrator 199 to quench tube 203. Resistor 224 in conjunction with resistor 201 serves to divide the integrated pulse down to the proper amplitude, and resistor 224 also serves to isolate shaping network 222, 223 from differentiating network 200, 201. The shaped pulses from the cathode circuit of tube 221, when combined with unquenching pulses also developed across resistor 201 and corresponding to those shown at 228, will yield a wave-form resembling that shown at 229. Quench tube 203, to which this is applied, will conduct during the intervals of positive potential and introduce damping into the tank circuit 182 of the superregenerator to inhibit oscillations therein. However during the intervals corresponding to the negative portions 230 of waveform 229, the superregenerator will be unquenched so as to permit oscillations to build up. Both the durations and amplitudes of these pulses increase throughout the sweep cycle and both will tend to increase the sensitivity of the superregenerator, the duration affecting the extent, and the amplitude, the rate of buildup of oscillations therein.

Alternatively shaped pulses of duration corresponding roughly to that of the sweep cycle may be derived from an R. C. circuit in the cathode circuit of sweep tube 213. Such pulses could be combined with variably delayed quenching pulses in the manner just described to yield pulses of varying duration and amplitude for controlled quenching. The R. C. circuit in the cathode circuit of the sweep tube would be required to have a much greater time constant than in the arrangement described in the previous paragraph (approximately 0.2 second in the present embodiment) which, in this instance, makes its use somewhat less desirable.

In the arrangement for securing automatic sensitivity control shown in Figures 4 and 4A, the modulator amplifier tube 221 from which the integrated pulse was derived comprised the two sections of type 6J6 double triode and the constants of the circuit were as follows:

| | |
|---|---:|
| Resistor 222 ohms | 4,700 |
| Condenser 223 mm.-farads | 150 |
| Resistor 224 ohms | 18,000 |
| Resistor 201 do | 4,700 |
| Resistor 225 do | 470,000 |
| Condenser 226 mm.-farads | 1,000 |

It may be pointed out that in this arrangement it will be desirable that condenser 226 be small so that the low impedance from grid to ground caused by firing of modulator tube 236 will not impair the operation of the integrating network 222, 223.

Still another embodiment of the invention will now be described in detail with reference to the partially schematic diagram of Figures 5 and 5A. This embodiment has already been described in general terms with reference to the block diagram of Figure 2 and, in order to relate corresponding components of the schematic to those of the block diagram, the same reference characters will be used wherever this may be feasible. The pulse repetition frequency oscillator 80 may be a multivibrator adjusted to oscillate at a frequency in the neighborhood of 2,000 cycles per second and producing substantially equal positive and negative half cycles. However, it will be recalled from the discussion of Figure 2 that the P. R. F. oscillator frequency is controlled with reference to the quench oscillator frequency during scanning to maintain a difference, between its frequency and a subharmonic of the quench oscillator frequency, of the order of 10 cycles per second. The frequency of the multivibrator 80 may thus be controlled in response to the bias applied to the grid of tube 280. In order to secure narrower pulses at the pulse repetition frequency, the output of tube 281 of the P. R. F. multivibrator is differentiated by means of a network comprising condenser 270 and resistor 271. The positive pulses resulting from differentiation and corresponding to the leading edges of the pulses from the multivibrator are used to control modulator 81 which in turn controls the generation of pulses of microwave energy at the pulse repetition frequency by transmitter 82. As in the case of the embodiments previously discussed, these are supplied through T-R box 83 to antenna 84. Received target reflected pulses are transmitted from antenna 84 through T-R box 83 to local oscillator and mixer 85. Pulses of intermediate frequency energy are amplified in intermediate frequency amplifier 86 and supplied to superregenerative oscillator 87 through connection 254 and inductor 255 coupled to tank circuit 256. Associated with superregenerator 87 may be an automatic regeneration control circuit similar to the ones discussed in connection with previously described embodiments of the invention. In this instance signal derived from a tap on the inductor of tank circuit 256 is supplied to a detector 257, the output of which is fed to an integrator 258 having a time constant of the order of magnitude of the interval between successive quench oscillator pulses. The output of integrator 258 is supplied to the grid of an automatic regeneration control tube 259 having its plate connected to the plate of the oscillator tube 260 and a condenser 282 connected between it and ground. The voltage developed across condenser 282 in the absence of any received signal may, by proper adjustment of the automatic regeneration control circuit, be made such as to maintain the superregenerative oscillator 87 at optimum sensitivity.

Quench oscillator 88 may be a multivibrator comprising tubes 283 and 284 adjusted to oscillate at a frequency of, for example, 80 kilocycles per second. The output from the plates of each of these tubes may be applied to quenching diodes 285 and 286 in push pull fashion to unquench superregenerative oscillator 87 at the 80 kilocycles per second rate, and to this end a connection 287 from the plate of diode 285 and the cathode of diode 286 to tank circuit 256 is provided. The advantage of this arrangement lies in the fact that there will be no shock excitation of the tank circuit on quenching or unquenching.

In order to maintain the proper frequency difference between the frequencies of P. R. F. oscillator 80 and quench oscillator 88, use is made of a coincidence circuit 89 comprising two triodes which may be connected in the manner shown. Pulses resulting from the differentiation of the P. R. F. pulses are supplied through an isolating tube 261 to the grid of one of these triodes. Also pulses from quench oscillator are supplied through connection 262 to the grid of the other triode. Output from the plate circuits of both triodes is supplied to the grid of a trigger tube 263, the bias on the grid of which is made such that the tube will not conduct unless pulses from the P. R. F. and quench oscillators occur simultaneously. The output of trigger tube 263 is supplied to a non-oscillatory multivibrator counter comprising tubes 264 and 265. This multivibrator is adjusted so that tube 265 will normally be cut off while tube 264 normally conducts. Upon the simultaneous occurrence of a P. R. F. and a quench oscillator pulse, the output of trigger tube 263 will momentarily alter this situation and cause tube 264 to cut off for a brief interval. During this interval the voltage across condenser 288 will be somewhat increased thereby increasing the bias on the grid of tube 280 of the P. R. F. oscillator. The circuits just described can readily be adjusted to maintain the desired difference between the frequency of the P. R. F. oscillator and the quench oscillator subharmonic.

As already explained in the description of Figure 2, it is desired, upon the simultaneous occurrence of an unquenching and a target reflected pulse, to modify the relationship between the frequencies of the P. R. F. and quench oscillators in order to lock the system on the target and give a continuous indication of target range. In doing this the frequency of the P. R. F. oscillator might be adjusted so as to correspond exactly to the subharmonic of quench oscillator 88 and this would yield satisfactory results assuming that the distance between the equipment and the target were to remain constant. However it is quite likely that in practice the target will be approaching the equipment and this would suggest the desirability, assuming that the P. R. F. oscillator during search was being maintained at a frequency higher than the subharmonic of the quench oscillator frequency, of reducing the P. R. F. oscillator frequency to a value somewhat lower than that of the quench oscillator in response to the receipt of a target signal. This would have the effect of reinitiating the sweep at a point corresponding to the distance somewhat less than the range at which the target signal was originally received and the system would then proceed to creep up on the target until the proper range had again been reached. The advantage of this mode of operation, which has already been discussed in connection with the other embodiments, is believed to be obvious inasmuch as it permits the system to continue following the target in range regardless of the fact that the distance from the equipment to the target may be diminishing. The means for achieving this result may comprise a connection 289 from detector 257 in the automatic regeneration control circuit of the superregenerative receiver through diode 266 to the grid of a cathode follower tube 267, and thence through connection 92 to the grid of tube 280 of the P. R. F. oscillator. In the presence of a target signal, because of the low impedance output provided by the cathode follower tube 267, the circuits just described will assume control over the operation of the P. R. F. oscillator and momentarily alter its frequency (or phase) despite the fact that control voltage will continue to be developed across condenser 288 by the coincidence circuit 89 and its associated trigger and counter tubes 263, 264 and 265. By connecting the cathode of diode 266 to a source of positive potential this control may be prevented from operating except on the output from detector 257 corresponding to the simultaneous arrival of a received signal and unquenching of the superregenerative receiver.

In the present embodiment range output is derived from a circuit which measures the interval between the occurrence of a given P. R. F. oscillator pulse and the next succeeding quench oscillator pulse. This circuit consists of a non-oscillatory multivibrator timer comprising triodes 268 and 269. A positive pulse corresponding to the leading edge of a P. R. F. oscillator pulse supplied through connection 94 to the grid of tube 268 will cause it to commence conducting and will cut off tube 269. Similarly a positive pulse from the quench oscillator supplied through connection 272 to the grid of tube 269 will cause the latter to commence conducting and tube 268 to cease conducting. Thus the interval during which tube 268 is conducting will be proportional to range whenever quench oscillator pulses and received target reflected pulses occur simultaneously. The negative pulses corresponding to the trailing edge of the P. R. F. oscillator pulses will have no effect on the timer circuits since in any case tube 268 will be cut off, prior to their occurrence, by the occurrence of a quench oscillator pulse. However, to prevent negative pulses from the quench oscillator from affecting operation of the timer circuit, it is desirable to include a clipper circuit comprising diodes 273 and 274 connected in the manner shown to limit the negative pulses corresponding to the trailing edges of the quench oscillator pulses. Because of the direct coupling between the quench oscillator and tube 269, the clipping of the negative pulses can not be complete, however it can be made sufficient to prevent their triggering the timer tube, and some positive bias may be applied to the grid of the succeeding integrator tube 275 which will then remove their effect completely. The grid of the latter tube, it will be noted, is connected direct to the plate of tube 268 and its function together with condenser 276 is to develop a sawtooth voltage the peak value of which will be proportional to the interval during which tube 268 is conducting. Peak detector 277 serves to measure this peak value and to develop a voltage proportional thereto which is supplied through cathode follower 268 to range indicator 279.

Subject matter shown and described in this specification but not claimed herein is claimed in copending applications assigned to the assignee of the present invention as follows:

The following subject matter, in copending application of William E. Bradley, Serial Number 651,398, filed March 1, 1946:

(1) A radio ranging system employing a transmitter of time-spaced pulse signals, a producer of other time-spaced pulse signals normally delayed by varying time intervals with reference to said transmitter pulses, a receiver of object-reflected transmitted pulses, and means responsive to the simultaneous occurrence of received and produced pulses for substantially altering the delay of produced pulses with reference to transmitted pulses.

(2) The representative embodiment of such a system as described with reference to Figures 2, 5 and 5A of this specification. The following subject matter in copending application of Wilson P. Boothroyd and Albert L. Free, Serial Number 651,888, filed March 4, 1946:

(1) A radio ranging system employing a transmitter of time-spaced signals, a producer of other time-spaced pulse signals normally delayed by varying time intervals with reference to said transmitter pulses, a receiver of object-reflected transmitted pulses, and means responsive to the simultaneous occurrence of received and produced pulses for altering the delay of produced pulses with reference to transmitted pulses in a manner to prevent another such simultaneous occurrence during a predetermined time interval.

(2) The representative embodiment of such a system employing a sweep circuit, comprising a gas tube and a condenser, and a separate gas tube for discharging the condenser by a predetermined amount upon the simultaneous occurrence of received and produced pulses, as shown and described with reference to Figures 4 and 4A of this specification.

(3) In a system of this sort, the method of and means for differentiating or otherwise narrowing and/or steepening quench pulses in order to achieve an appreciable difference between superregenerative receiver output in the presence and in the absence of received signal, as shown and described with reference to Figures 4 and 4A of this specification.

(4) In a system of this sort, the utilization of a cathode follower tube between the sweep and delay tubes, from an impedance in the cathode circuit of which an output signal dependent on target range is derived, as shown and described with reference to Figures 4 and 4A of this specification.

(5) In a system of this sort, means for rendering an indicating or other utilization device, which is normally inoperative, operative when the output from the system corresponds to the range of an actual target, and the arrangement for achieving this result as shown and described with reference to Figures 4 and 4A of this specification.

(6) In a system of this sort, the method of and means for controlling the sensitivity of the superregenerative receiver as a function of the delay of produced pulses with reference to transmitted pulses, and the specific method of and means for doing this by causing the delay tube to generate pulses of varying width, the steepness of whose trailing edges is a function of said width, differentiating said pulses to derive other pulses whose characters are a function of the steepness of said trailing edges, and utilizing the latter pulses to unquench a superregenerative receiver whose sensitivity is a function of the character of unquenching pulses applied to it, as shown and described with reference to Figures 4 and 4A of this specification.

(7) In a system of this sort, the method of and means for fixing the minimum range of target at which the system will respond, as shown and described with reference to Figures 4 and 4A of this specification.

(8) In a system of this sort, methods of and means for modifying the operation thereof so as to cause the system to seek targets at either closer or greater range as shown and described with reference to Figures 4 and 4A.

The following subject matter in copending application of Kenneth H. Emerson, Serial Number 651,649, filed March 2, 1946:

(1) A system comprising a superregenerative receiver of time-spaced pulse-modulated carrier wave signals, means for unquenching said receiver during time-spaced intervals, at least some of said intervals coinciding with the arrival of received pulses, and means for controlling the sensitivity of said receiver in response to its output in the absence of received signals.

The following subject matter in copending application of Albert L. Free and de Bremond B. Hoffman, Serial Number 657,404, filed March 27, 1946:

(1) In a radio ranging system of the general sort described, employing a superregenerative receiver of object-reflected transmitted pulses adapted to be unquenched in response to pulse signals supplied to it and having its sensitivity determined by the character of said pulses, and a producer of other time-spaced pulse signals normally delayed by varying time intervals with reference to said transmitter pulses, the method of and means for controlling the sensitivity of said receiver by modifying the character of said produced pulses as a function of their delay and applying them to the receiver to unquench it and control its sensitivity.

(2) The means for achieving this result shown and described with reference to Figures 4 and 4A of this specification.

Figure 5:
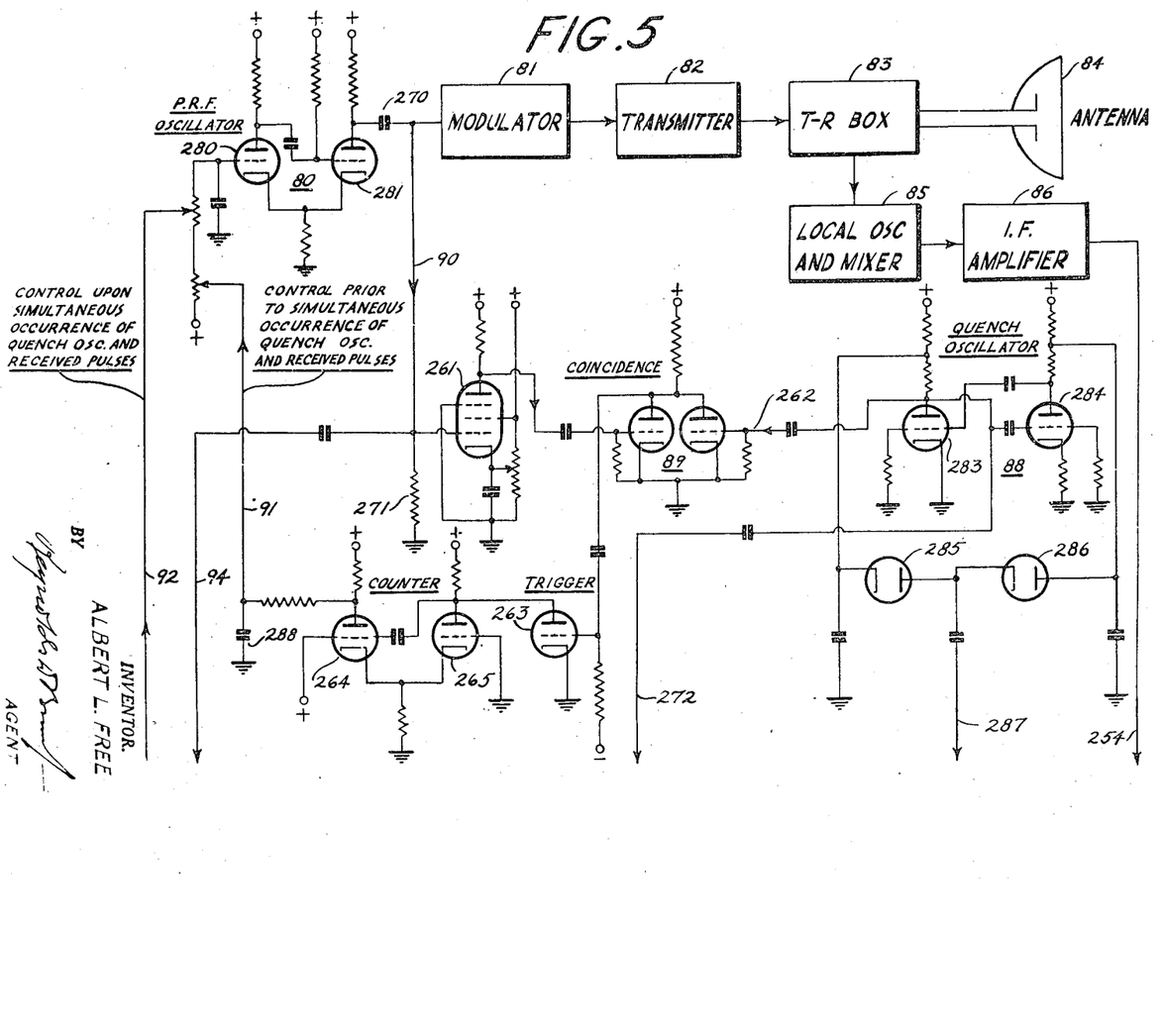
Figs. 5 and 5A, taken together, constitute a schematic diagram of another form of system employing the invention.
Figure 5A:
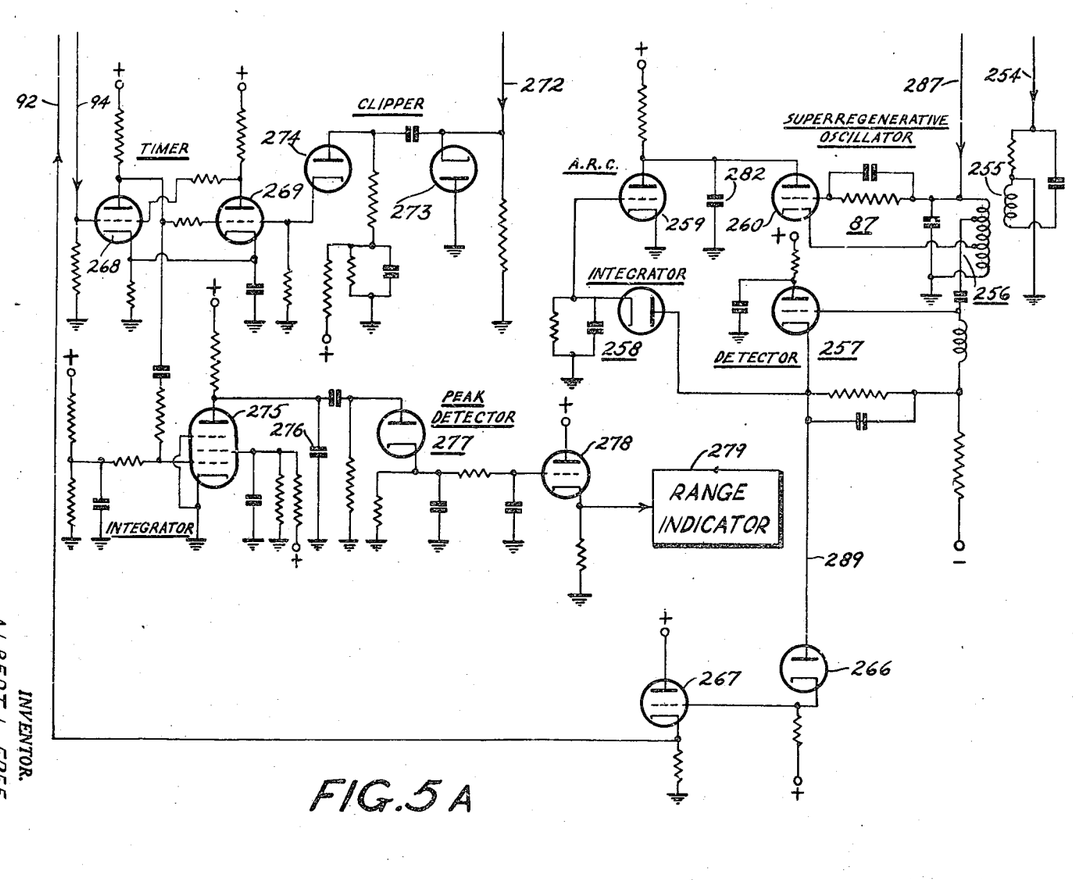

The following subject matter in copending application of Wilson P. Boothroyd, Serial Number 660,905, filed April 10, 1946:

(1) In a system of the general sort described, the method and means for deriving an output signal which is a function of range, comprising initiating the operation of an integrating circuit in response to the transmission of a pulse signal terminating the integration of said integrating circuit in response to the reception of the reflection of said pulse from an object, and deriving an indication of variations in the peak output of said integrating circuit, as shown and described with reference to Figures 5 and 5A of this specification.

The following subject matter in copending application of Joseph C. Tellier and Harry H. Wilson, Jr., Serial Number 660,036, filed April 4, 1946:

(1) The arrangement, in a superregenerative receiver, of a multivibrator quenching oscillator push-pull connected through a diode quenching circuit to the tank circuit of the superregenerative oscillator, as shown and described with reference to Figure 5 of this specification.

The following subject matter in copending application of William E. Bradley, Serial Number 660,037, filed April 6, 1946:

(1) The quenching circuit for a superregenerative receiver, comprising a pair of diodes oppositely connected and coupled to the tank circuit of a superregenerative receiver, as shown and described with reference to Figure 4A of this specification.

I claim:

1. In a radio ranging system, a transmitter of time-spaced pulse signals, a producer of other time-spaced pulse signals variably delayed with respect to said transmitted pulses, a superregenerative receiver of object-reflected transmitted pulses and means for unquenching said receiver in response to said delayed pulses, means responsive to simultaneous occurrence of a received pulse and a delayed pulse for controlling the delay of said other pulses with respect to said transmitted pulses to effect coincidence of a subsequent delayed pulse with a subsequent reflected pulse received from the same target object following the occurrence of at least a predetermined number of delayed pulses which occur non-simultaneously with received reflections, means utilizing the output of said receiver to control its sensitivity, and means for deriving an output which is a function of the delay of said delayed pulses with respect to said transmitter pulses.

2. In a radio ranging system, a transmitter of time-spaced pulse signals, a producer of other time-spaced pulse signals normally delayed by varying amounts with reference thereto, a superregenerative receiver of object-reflected transmitted pulses and means for unquenching said receiver in response to said delayed pulses, means responsive to the output of said receiver upon the simultaneous arrival of a received pulse and unquenching of said receiver for modifying the delay of at least a predetermined number of said delayed pulses to effect unquenching of said receiver simultaneously with the arrival of a subsequent reflected pulse received from the same target object following at least a predetermined number of unquenchings which occur non-simultaneously with the arrival of a received pulse, means utilizing the output of said receiver to control its sensitivity, and means for deriving an output which is a function of the delay between the transmission of a pulse and the unquenching of said receiver.

3. In a radio ranging system, a transmitter of time-spaced pulse signals, a producer of other time-spaced pulse signals normally delayed by varying amounts with reference to said transmitted pulses, a superregenerative receiver of object-reflected transmitted pulses and means for unquenching said receiver in response to said delayed pulses, means responsive to the simutaneous arrival of a received pulse and unquenching of said receiver for modifying the delay of at least a predetermined number of said delay pulses to effect unquenching of said receiver simultaneously with the arrival of a subsequent reflected pulse received from the same target object following at least a predetermined number of unquenchings which occur non-simultaneously with the arrival of a received pulse, means utilizing the output of said receiver to control its sensitivity, and means for deriving an output which is a function of the delay between the transmission of a pulse and the unquenching of said receiver.

4. In a radio ranging system, a transmitter of time-spaced pulse signals, a producer of other time-spaced pulse signals controllably delayed with reference to said transmitted pulses, a superregenerative receiver of object-reflected transmitted pulses and means for unquenching said receiver in response to said delayed pulses, means normally varying the delay between said transmitted pulses and said delayed pulses in a cyclic manner within a predetermined range, means responsive to simultaneous occurrence of a received pulse and a delayed pulse for modifying said cyclic variation to effect simultaneous occurrence of a subsequent delayed pulse with a subsequent reflected pulse received from the same target object following the occurrence of at least a predetermined number of delayed pulses which occur non-simultaneously with received reflections and prior to the time when such simultaneous occurrence would take place as a result of the normal variation in delay between said transmitted pulses and said delayed pulses, means utilizing the output of said receiver to control its sensitivity, and means for deriving an output which is a function of the delay of said delayed pulses with respect to said transmitted pulses.

5. In a radio ranging system, a transmitter of time-spaced pulse signals, a superregenerative receiver of object-reflected transmitted pulses, means for unquenching said receiver during successive intervals variably delayed with respect to said transmitted pulses, means responsive to the simultaneous arrival of received pulses and unquenching of said receiver for controlling the delay of said unquenched intervals with reference to said transmitted pulses to effect unquenching of said receiver simultaneously with the arrival of a subsequent reflected pulse received from the same target object following at least a predetermined number of unquenchings which occur non-simultaneously with the arrival of received reflections, means utilizing the output of said receiver to control its sensitivity, and means for deriving an output which is a function of the delay between the transmission of a pulse and the unquenching of said receiver.

6. In a radio ranging system, a transmitter of time-spaced pulse signals, means responsive to pulses from said transmitter for producing other pulses variably delayed with reference to said transmitter pulses, a superregenerative receiver of object-reflected transmitted pulses and means for unquenching said receiver in response to said delayed pulses, means responsive to the simultaneous arrival of a received pulse and unquenching of said receiver for controlling the delay of said other pulses with reference to said transmitter pulses to effect simultaneously occurrence of a subsequent delayed pulse with a subsequent reflected pulse received from the same target object following the occurrence of at least a predetermined number of delayed pulses non-simultaneously with received reflections, means utilizing the output of said receiver to control its sensitivity, and means for deriving an output which is a function of the delay of said delayed pulses with respect to said transmitted pulses.

7. In a radio ranging system, a transmitter of time-spaced pulse signals, a superregenerative receiver of object-reflected transmitted pulses, a producer of other time-spaced pulse signals controllably delayed with reference to said transmitter pulses, a source of a normally recurrent waveform, means for controlling the delay of said other pulses in accordance with the variations of said recurrent waveform, means responsive to said delayed pulses for unquenching said receiver, means responsive to the simultaneous arrival of received pulses and unquenching of said receiver for modifying said recurrent waveform to effect unquenching of said receiver simultaneously with the arrival of a subsequent reflected pulse received from the same target object following at least a predetermined number of unquenchings which occur non-simultaneously with the arrival of received reflections and prior to the time when such simultaneous occurrence would take place as a result of the normal variation in delay of said other pulses with reference to said transmitted pulses, means utilizing the output of said receiver to control its sensitivity, and means for deriving an output which is a function of the delay between the transmission of a pulse and the unquenching of said receiver.

8. A system according to claim 7, in which said source of a normally recurrent waveform comprises a condenser and means for periodically charging and discharging said condenser, and in which said means for modifying said recurrent waveform comprises means responsive to the simultaneous arrival of received pulses and unquenching of said receiver for discharging said condenser by a predetermined amount.

9. In a radio ranging system, a transmitter of time-spaced pulse signals, a producer of other time-spaced pulse signals, a superregenerative receiver of object-reflected transmitted pulses and means for unquenching said receiver in response to said other pulses, means normally varying the time-spacing between said transmitted pulses and said other pulses in a cyclic manner to effect at least one coincidence per cycle of one of said other pulses and a received pulse produced by reflection from a target at a predetermined range, means responsive to such coincidence for modifying the normal variation of said time-spacing to effect a coincidence of one of said other pulses and a received pulse produced by reflection from said target following the occurrence of at least a predetermined number of said other pulses non-coincident with such a received pulse and prior to the time when such simultaneous occurrence would take place as a result of the normal variation of the time-spacing between said transmitted pulses and said other pulses, means utilizing the output of said receiver to control its sensitivity, and means for deriving an output which is a function of the time-spacing between said transmitter pulses and said other pulses.

ALBERT L. FREE.

REFERENCES CITED

The following references are of record in the file of this patent:

UNITED STATES PATENTS

| Number | Name | Date |
|---|---|---|
| 2,147,595 | Hilferty | Feb. 14, 1939 |
| 2,333,119 | Packard | Nov. 2, 1943 |
| 2,404,527 | Potapenko | July 23, 1946 |
| 2,414,992 | Wheeler | Jan. 28, 1947 |
| 2,419,541 | De Rosa | Apr. 29, 1947 |
| 2,421,018 | De Rosa | May 27, 1947 |
| 2,422,382 | Winchel | June 17, 1947 |